United States Patent
Muurinen et al.

(10) Patent No.: US 10,044,234 B2
(45) Date of Patent: Aug. 7, 2018

(54) MULTI-COIL WIRELESS POWER APPARATUS

(71) Applicant: Nokia Technologies Oy, Espoo (FI)

(72) Inventors: Jari Muurinen, Perniö (FI); Petri Vuori, Salo (FI)

(73) Assignee: Nokia Technologies OY, Espoo (FI)

( * ) Notice: Subject to any disclaimer, the term of this patent is extended or adjusted under 35 U.S.C. 154(b) by 257 days.

(21) Appl. No.: 14/892,541

(22) PCT Filed: May 31, 2013

(86) PCT No.: PCT/FI2013/050593
§ 371 (c)(1),
(2) Date: Nov. 19, 2015

(87) PCT Pub. No.: WO2014/191609
PCT Pub. Date: Dec. 4, 2014

(65) Prior Publication Data
US 2016/0181855 A1    Jun. 23, 2016

(51) Int. Cl.
*H02J 7/00* (2006.01)
*H02J 50/80* (2016.01)
(Continued)

(52) U.S. Cl.
CPC ............... *H02J 50/80* (2016.02); *H02J 7/04* (2013.01); *H02J 17/00* (2013.01); *H02J 50/12* (2016.02);
(Continued)

(58) Field of Classification Search
USPC .................................. 320/106, 107, 108, 109
See application file for complete search history.

(56) References Cited

U.S. PATENT DOCUMENTS

2010/0109445 A1   5/2010   Kurs et al.
2010/0148939 A1   6/2010   Yamada et al.
(Continued)

FOREIGN PATENT DOCUMENTS

CN   102265480 A   11/2011
CN   102362408 A   2/2012
(Continued)

OTHER PUBLICATIONS

Office action received for corresponding Chinese Patent Application No. 201380078578.2, dated Jun. 2, 2017, 7 pages of office action and no pages of translation available.
(Continued)

*Primary Examiner* — Brian Ngo
(74) *Attorney, Agent, or Firm* — Banner & Witcoff, Ltd.

(57) ABSTRACT

The invention relates to a multi-coil wireless power apparatus (100) comprising a first wireless power circuit (121) connectable to a first resonant tank (101, 21), wherein the first resonant tank (101, 21) is arranged to transfer inductive energy at a first frequency, and a second wireless power circuit (122) connectable to a second resonant tank (102, 22), wherein the second resonant tank (102, 22) is arranged to transfer inductive energy at a second frequency. The first resonant tank (101,21) is tunable to the second frequency when the second inductive energy coil (106, 26, 32, 42, 52) is active. The invention further relates to an apparatus and a computer program product.

20 Claims, 4 Drawing Sheets

(51) Int. Cl.
*H02J 17/00* (2006.01)
*H02J 7/04* (2006.01)
*H02J 50/40* (2016.01)
*H02J 50/12* (2016.01)
*H02J 50/50* (2016.01)
*H02J 7/02* (2016.01)

(52) U.S. Cl.
CPC .............. *H02J 50/40* (2016.02); *H02J 50/50* (2016.02); *H02J 7/02* (2013.01)

(56) References Cited

U.S. PATENT DOCUMENTS

| | | | |
|---|---|---|---|
| 2011/0115303 A1 | 5/2011 | Baarman et al. | |
| 2011/0133569 A1 | 6/2011 | Cheon et al. | |
| 2012/0248887 A1 | 10/2012 | Kesler et al. | |
| 2012/0329405 A1* | 12/2012 | Lee | H02J 17/00 455/73 |
| 2013/0043734 A1 | 2/2013 | Stone et al. | |
| 2013/0062961 A1* | 3/2013 | Park | H02J 17/00 307/104 |
| 2013/0249305 A1* | 9/2013 | Kudo | H02J 17/00 307/104 |
| 2014/0354223 A1* | 12/2014 | Lee | H02J 5/005 320/108 |
| 2016/0336759 A1* | 11/2016 | Yamamoto | H02J 50/60 |

FOREIGN PATENT DOCUMENTS

| | | |
|---|---|---|
| CN | 102714430 A | 10/2012 |
| CN | 103098330 A | 5/2013 |
| JP | 2014-522630 A | 9/2014 |
| WO | 2008/137996 A1 | 11/2008 |
| WO | 2010/035256 A2 | 4/2010 |
| WO | 2011/077493 A1 | 6/2011 |
| WO | 2011/156555 A2 | 12/2011 |
| WO | 2012/166124 A1 | 12/2012 |
| WO | 2012/166126 A1 | 12/2012 |
| WO | 2013065245 | 5/2013 |
| WO | 2013/157191 A1 | 10/2013 |
| WO | 2014/038265 A1 | 3/2014 |

OTHER PUBLICATIONS

International Search Report and Written Opinion received for corresponding Patent Cooperation Treaty Application No. PCT/FI2013/050593, dated Feb. 13, 2014, 11 pages.

Notice of Allowance received for corresponding Japanese Patent Application No. 2016-516211, dated Dec. 7, 2016, 3 pages of Allowance and no page of translation available.

Extended European Search Report received for corresponding European Patent Application No. 13886081.2, dated Jan. 17, 2017, 6 pages.

* cited by examiner

MULTI-COIL WIRELESS POWER APPARATUS

RELATED APPLICATION

This application was originally filed as PCT Application No. PCT/FI2013/050593 filed May 31, 2013.

BACKGROUND

Electromagnetic induction has been known for a long time and it has been used in many applications. In electromagnetic induction a time-varying magnetic flux induces an electromotive force to a closed conductor loop. Vice versa, a time-varying current creates a varying magnetic flux. In transformers, this phenomenon is utilized to transfer energy wirelessly from circuit to another via inductively coupled coils. A primary coil transforms an alternating current into a varying magnetic flux, which is arranged to flow through the secondary coil. The varying magnetic flux then induces an alternating voltage over the secondary coil. The proportion of the input and output voltage can be adjusted by the number of turns in the primary and secondary coils.

Wireless charging is another application where electromagnetic induction is used to transfer energy over air. A wireless charging system comprises a charger device with a primary coil, and a device to be charged with a secondary coil. The current in the charger device is transferred to the charged device through these electromagnetically coupled coils, and the induced current may be further processed and used to charge the battery of the charged device. Energy is transmitted through inductive coupling from the charger device to the charged device, which may use that energy to charge batteries or as direct power.

A trend in today's portable devices, e.g. in portable electronics, is an inductive charging capability. The device comprising wireless charging capability may use a wireless charger device as a power source in various surroundings without a need to connect the device to the charger by a wire. However, it may not be possible to use whatever inductive charger device to charge inductively whatever device comprising wireless charging capability i.e. the wireless charging transmitter should use similar frequency/standard as the wireless charging receiver.

SUMMARY

The present application relates generally to wireless charging systems wherein electromagnetic field is used to transfer energy over air. A wireless charging system may, for example, comprise a pair of coils coupled to each other for transferring energy by means of electromagnetic induction. In particular, the invention relates to a multi-coil wireless power apparatus. Various aspects of the invention include a method, an apparatus, and a computer readable medium comprising a computer program stored therein, which are characterized by what is stated in the independent claims. Various embodiments of the invention are disclosed in the dependent claims.

According to a first aspect of the invention, there is provided an apparatus, comprising a first wireless power circuit connectable to a first resonant tank comprising a first inductive energy coil, a frequency tuner, a resonance mode switch and a power delivery mode switch, wherein the first resonant tank is arranged to transfer inductive energy at a first frequency, a second wireless power circuit connectable to a second resonant tank comprising a second inductive energy coil, wherein the second resonant tank is arranged to transfer inductive energy at a second frequency, wherein the first frequency is different than the second, and a control logic circuit configured to determine which coil is active and when the second coil is determined to be active the resonance mode switch is arranged to enable tuning of the first resonant tank to the second frequency, and wherein the power delivery mode switch is arranged to disconnect the first inductive energy coil from the first wireless power circuit when the second inductive energy coil is determined to be active.

According to an embodiment, when the control logic circuit has determined that the first coil is active, the resonance mode switch is arranged to disable tuning of the first tank to the second frequency, and the power delivery mode switch is arranged to enable an electrical connection between the first inductive energy coil and the first wireless power circuit for transferring inductive energy. According to an embodiment, the second resonant tank further comprises a second resonance mode switch and a second power delivery mode switch. According to an embodiment, when the control logic circuit has determined that the first coil is active, the second resonance mode switch is arranged to enable tuning of the second tank to the first frequency, and the second power delivery mode switch is arranged to disconnect the second inductive energy coil from the second wireless power circuit. According to an embodiment, when the control logic circuit has determined that the second coil is active, the second resonance mode switch is arranged to disable tuning of the second tank to the first frequency, and the second power delivery mode switch is arranged to enable electrical connection between the second inductive energy coil and the second wireless power circuit for transferring inductive energy. According to an embodiment, at least one of the first and second wireless power circuits is a wireless power receiver circuit, and wherein the control logic is configured to determine which coil is active based on receiving an activity indication from the wireless power receiver circuit. According to an embodiment, the control logic circuit is configured to send a request for activity indication to the wireless power receiver circuit. According to an embodiment, the frequency tuner comprises a capacitor. According to an embodiment, the apparatus is a mobile phone.

According to a second aspect of the invention, there is provided a method comprising: determining an active inductive energy coil of a multi-mode wireless charging apparatus comprising a first resonant tank, a first wireless power circuit connectable to the first resonant tank, and a second resonant tank, wherein the first resonant tank comprises a first inductive energy coil, a first frequency tuner, a resonance mode switch and a power delivery mode switch, wherein the first inductive energy coil is arranged to transfer inductive energy at a first frequency, and the second resonant tank comprises a second inductive energy coil, wherein the second inductive energy coil is arranged to transfer inductive energy at a second frequency, wherein the first frequency is different than the second frequency, and enabling tuning of the first resonant tank to the second frequency by the resonance mode switch and disconnecting the first inductive energy coil from the first wireless power circuit by the power delivery mode switch when the second inductive energy coil is determined to be active.

According to an embodiment, the method further comprises: disabling tuning of the first tank to the second frequency by the resonance mode switch and enabling an electrical connection between the first inductive energy coil and the first wireless charging receiver circuit for transferring inductive energy by the power delivery mode switch when the first inductive energy coil is determined to be active. According to an embodiment, when the second resonant tank further comprises a second wireless power circuit connectable to the second resonant tank, a second resonance mode switch and a second power delivery mode switch, the method further comprises: enabling tuning of the second resonant tank to the first frequency by the second resonance mode switch and disconnecting the second inductive energy coil from the second wireless power circuit by the second power delivery mode switch when the first inductive energy coil is determined to be active. According to an embodiment, the method further comprises disabling tuning of the second tank to the first frequency by the second resonance mode switch and enabling an electrical connection between the second inductive energy coil for receiving inductive energy by the second power delivery mode switch when the second inductive energy coil is determined to be active. According to an embodiment, at least one of the first and second wireless power circuits is a wireless power receiver circuit, and determining of active coil bases on receiving an activity indication from the wireless power receiver circuit. According to an embodiment, the control logic circuit is configured to send a request for activity indication to the wireless power receiver circuit. According to an embodiment, the frequency tuner comprises a capacitor.

According to a third aspect of the invention, there is provided a computer program product embodied on a non-transitory computer readable medium, comprising computer program code configured to, when executed on at least one processor, cause an apparatus to: determine an active inductive energy coil of the apparatus comprising a first resonant tank, a first wireless power circuit connectable to the first resonant tank, and a second resonant tank, wherein the first resonant tank comprises a first inductive energy coil, a first frequency tuner, a resonance mode switch and a power delivery mode switch, wherein the first inductive energy coil is arranged to transfer energy at a first frequency, and the second resonant tank comprises a second inductive energy coil, wherein the second inductive energy coil is arranged to transfer inductive energy at a second frequency, wherein the first frequency is different than the second frequency, enable tuning of the first resonant tank to the second frequency by the resonance mode switch, and disconnect the first inductive energy coil from the first wireless power circuit by the power delivery mode switch when the second inductive energy coil is determined to be active.

According to a fourth aspect of the invention, there is provided an apparatus comprising: means for determining an active inductive energy coil of a multi-mode wireless charging device comprising a first resonant tank and a second resonant tank, wherein the first resonant tank comprises means for transferring inductive energy at a first frequency, means for tuning, means for delivering power, means for switching resonance mode and means for switching power delivery mode, and the second resonant tank comprises second means for transferring inductive energy at a second frequency, wherein the first frequency is different than the second frequency, and wherein said means for switching resonance mode are arranged to enable tuning of the first resonant tank to the second frequency, and said means for switching resonance mode are arranged to disable said means for delivering power when the second inductive energy coil is determined to be active.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of an apparatus for receiving inductive energy from a charger device. The apparatus for receiving inductive energy may be a mobile device, for example, a mobile phone, a mobile computer, a mobile collaboration device, a mobile internet device, a smart phone, a tablet computer, a tablet personal computer (PC), a personal digital assistant, a handheld game console, a portable media player, a digital still camera (DSC), a digital video camera (DVC or digital camcorder), a pager, a personal navigation device (PND) or any other device suitable to receive energy using/by inductive coupling or magnetic resonance, i.e., an inductive energy link. It is to be noted, however, that the invention is not limited to mobile devices only. In fact, the different embodiments may have applications widely in any environment where a device needs a wireless charging receiver coil arrangement for inductive-based energy reception. The wireless charging receiver coil arrangement comprises an inductive energy receiver coil and a frequency tuner e.g. a capacitor. When connected together, the inductive energy receiver coil and the capacitor form a resonant tank that can act as an electrical resonator capable of receiving inductive energy. In embodiments of the invention, the wireless charging receiver coil arrangement may be generally referred to as a resonant tank.

In each of a WLC transmitter and a WLC receiver of a magnetic resonance-based wireless power transmission system, one resonator that resonates at a transmission frequency is included. When resonant frequencies of the resonator of the WLC transmitter and the resonator of the WLC receiver are the same, the efficiency of the energy transmission is maximized. Different wireless charging standards may operate at different frequencies and therefore a multi-standard WLC device may comprise dedicated software or hardware to support each standard. For example, a plurality of coil arrangements may be configured to transfer, i.e. transmit or receive, inductive energy according to various standards. In the WLC receiver a resonant tank structure may act as a resonator. Resonant tanks may comprise one a frequency tuner and one planar coil arrangement, for example, a loop coil, as inductive energy receiver coil. Each resonant tank may act as an inductive-energy receiver that operates at a particular frequency.

And each resonant tank is suitable to receive energy i.e. to be charged by a charger device whose WLC transmitter resonates at a transmission frequency corresponding to that particular frequency of the resonant tank. Thus, a mobile device comprising one resonant tank may be charged by a charging device having suitable charging standard i.e. corresponding resonant frequency for that particular resonant tank. In order to make devices comprising WLC receivers operate at two different frequencies i.e. to support receiving wireless power according to two different standards, for example, at 100 kHz and 6.78 kHz, two separate resonators i.e. two separate resonant tanks may be implemented in a WLC receiver. Naturally, additional structures require additional space and cost. WLC receivers comprising two or more WLC resonant tanks may be called multi-standard WLC receivers or multi-coil wireless power apparatuses.

A multi-standard WLC receiver comprising two or more WLC resonant tanks may correspondingly operate at two or more frequencies one at a time. In some implementations each tank is used separately for a wireless power transmission operation with different standards/frequencies i.e. there is no joint usage. This means that only the tank that is currently in use for receiving wireless power i.e. only the active tank is connected to a power delivery circuitry, for example, to a battery charging IC, and the other tank/s are disconnect from the circuitry to prevent parasitic load for the active charging tank. However, due to additional space and cost of multi-standard structures it would be preferable to utilize these structures in addition to the benefit that the multi-standard WLC receiver has multi-frequency charging capability.

So instead of just disconnecting non-active resonant tanks i.e. tanks that are not transferring energy wirelessly from a power delivery circuitry of a multi-standard WLC receiver, the embodiments of the invention use non-active resonant tanks as additional resonators, which are by default tuned to different frequencies to support different standards. The embodiments of the invention enable the non-active resonant tank to be tuned to the frequency of the active resonator for improving charging efficiency of the multi-standard WLC receiver. To enable this, the multi-standard WLC receiver structures comprise a resonance mode switch to enable/disable tuning to the frequency of an active tank and a power delivery mode switch to enable/disable charging functionality of a non-active tank. It should be noted that in power delivery mode the WLC receiver may use the energy directly instead of charging the energy. For example, in a device with a multi-standard WLC receiver comprising two different resonant tanks, a first and a second, the first tank includes a resonance mode switch to enable/disable tuning to the frequency of the second tank (active tank) and a power delivery mode switch to enable/disable charging functionality. The resonance mode switch (in enable state) and capacitor of the first tank defines the resonant tank frequency of the first tank and the power delivery mode switch which may be implemented as a part of a synchronous rectification circuit (in disable state) acts as an isolator that cuts away the first resonator tank from power supply chain. Therefore, when the power delivery mode switch is in disable state and the resonance mode switch is in enable state, the first tank is tuned to the frequency of the second tank, for enabling as an additional resonator increase of the magnetic flux through the active charging coil of the second tank. Increment of the magnetic flux through the active charging coil of the second tank improves charging efficiency. Thus, the embodiments of the invention optimize magnetic reception characteristics by using a non-active resonant tank as a high Q-value magnetic lens directing magnetic flux to an active resonant tank that is connected to power delivery circuitry. Resonant tanks comprising these kinds of switch structures may be called multi-mode resonant tanks.

Thus, an example of the invention is to tune a first multi-mode resonant tank of a mobile device to the resonance frequency of a second resonant tank when the second resonant tank is active, i.e., it is receiving energy for charging. The mobile device may comprise control logic to determine which of the resonant tanks is active and which should be disabled and used as an additional resonator. The control logic may be connected to the WLC receivers that are capable of determining whether the charging signal is according to the particular standard supported by that receiver. If one of the receivers determines that there is a valid charging signal for it, the control logic (or the active WLC receiver) may enable the resonant mode in the resonant tank circuit of the non-active WLC receiver. Enabling the resonant mode may comprise disconnecting the non-active resonant tank from the WLC receiver circuitry and/or connecting an additional capacitor or other tuning means to the resonant tank of the non-active WLC receiver. However, it is also possible that both resonant tanks comprises a resonance mode switch to enable tuning to the frequency of the other tank when the other tank is in active state and a power delivery mode switch to disable power transmission when the tank is a non-active tank i.e. when the other tank is in active state. In addition, it is also possible that there are more than two resonant tanks, for example, three or more, comprising a resonance mode switch and a power delivery mode switch, wherein resonance mode switches enable tuning of non-active tanks to the frequency of an active resonant tank while power delivery mode switches disable power transmission of same non-active tanks.

An example embodiment of the present invention and its potential advantages are understood by referring to FIGS. 1 through 6 of the drawings.

Figure 1:
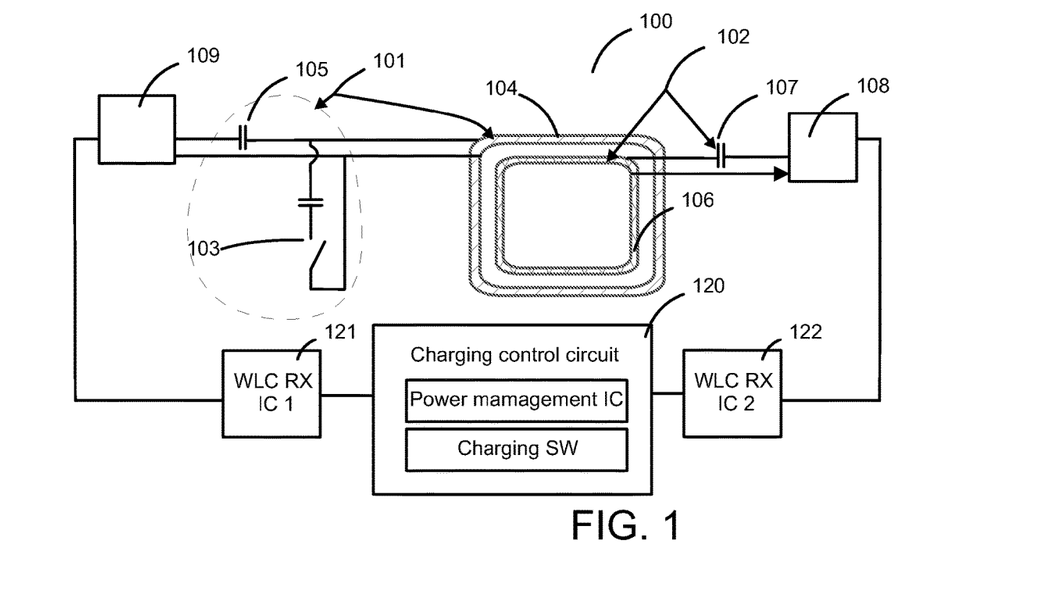
FIG. 1 shows a multi-standard WLC receiver structure according to an example embodiment.

FIG. 1 shows a multi-standard WLC receiver structure 100 according to an example embodiment. The multi-standard WLC receiver structure 100 comprises two resonant tanks 101, 102 i.e. wireless charging receivers which are arranged to operate at two different frequencies. The first resonant tank 101 is so called multi-mode resonant tank comprising a resonance mode switch 103 and a power delivery mode switch (not shown) in addition to a coil 104 and capacitor 105. The capacitor 105 may be replaced by some other frequency tuner. In on-mode of the resonance mode switch 103, when the first resonant tank 101 is non-active and the second resonant tank 102 is active, the resonance mode switch 103 of the first resonant tank 101 enables tuning of the first resonant tank 101 to the frequency of the second tank 102. Tuning the resonant tank 102 may be done for example by connecting capacitor 105 between the terminals of the coil 104. It is also possible to connect only a part of the coil 104 to resonance that is in this case the frequency of the second tank 102. Resonant tank frequency of the first tank 101 may be defined by the resonance mode switch 103 and the capacitor 105 in the on-mode of the resonance mode switch 103. And further, when the first resonant tank 101 is active and/or the second resonant tank 102 is non-active, the resonance mode switch 103 of the first resonant tank 101 is commanded to the off-mode and tuning is disabled. A control logic circuit 120 may determine which coil is active and which should be disabled and used as an additional resonator for the active coil. The control logic circuit 120 may control the on/off-mode of resonance mode switch 103 and power delivery mode switch.

The power delivery mode switch may be, for example, a part of a synchronous rectification circuit 109 or it may be an active switch dedicated to act as a power delivery mode switch. The power delivery mode switch is commanded to on-mode, i.e. to enable electrical connection between first resonant tank 101 and first wireless power receiver circuit (WLC RX IC 1) 121, when the first resonant tank 101 is active and the second resonant tank 102 is non-active, and in on-mode it may enable power transmission of the resonant tank 101. And further, in off-mode i.e. when the first resonant tank 101 is non-active and the second resonant tank 102 is active, the power delivery mode switch disables charging functionality i.e. power transmission of the resonant tank 101 by isolating the first resonant tank 101 from the first wireless charging receiver circuit so that the resonant tank 101 does not act as a parasitic load or parasitic load caused by resonant tank 101 is reduced for the active second resonant tank 102. The second resonant tank 102 comprises a coil 16 and capacitor 17 and the second resonant tank 102 is connected to a synchronous rectification circuit 108.

Figure 2:
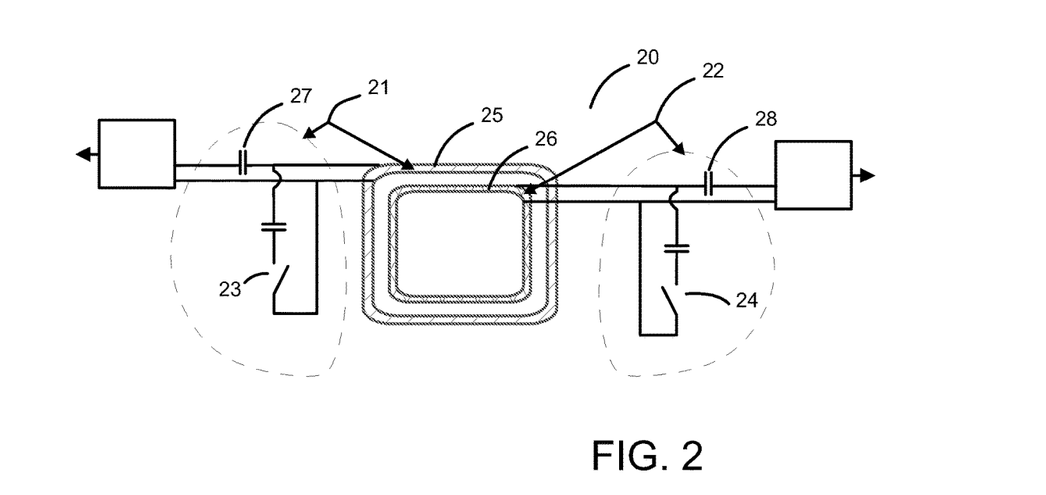
FIG. 2 shows a multi-standard WLC receiver structure according to an example embodiment.

FIG. 2 shows a multi-standard WLC receiver structure 20 according to an example embodiment. The structure 20 differs from structure 100 in that in structure 20 both tanks 21, 22 have a resonance mode switch 23, 24 and a power delivery mode switch (not shown) in addition to a coil 25, 26 and a capacitor 27, 28. Thus, in this case, the tank 21 can be used as a high Q-value magnetic lens directing magnetic flux to the resonant tank 22, when the tank 22 is in active state and the tank 22 can be used as a high Q-value magnetic lens directing magnetic flux to the resonant tank 21, when the tank 21 is in active state.

Figure 3A:
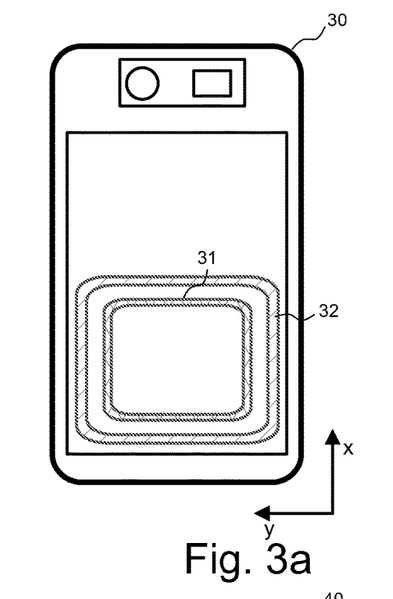
FIG. 3a shows a back-side view of a mobile device with resonant coils of resonant tanks according to an example embodiment.

FIG. 3a shows a back-side view of a mobile device 30 with inductive energy receiver coils of resonant tanks according to an example embodiment. In this embodiment coils 31, 32 form planes and the normal of the planes are parallel i.e. normal of the coil 31 parallels normal of the coil 32. And when seen from above i.e. in the direction of the normal (z-direction) the coil 32 surrounds the coil 31. However, coils 31, 32 can be arranged to the same plane (see FIG. 3b), partly to the same plane (see FIG. 3c), or to different planes (see FIG. 3d) inside the mobile 30. All parts of the mobile device 30 are not shown.

Figures 3B, 3C, 3D:
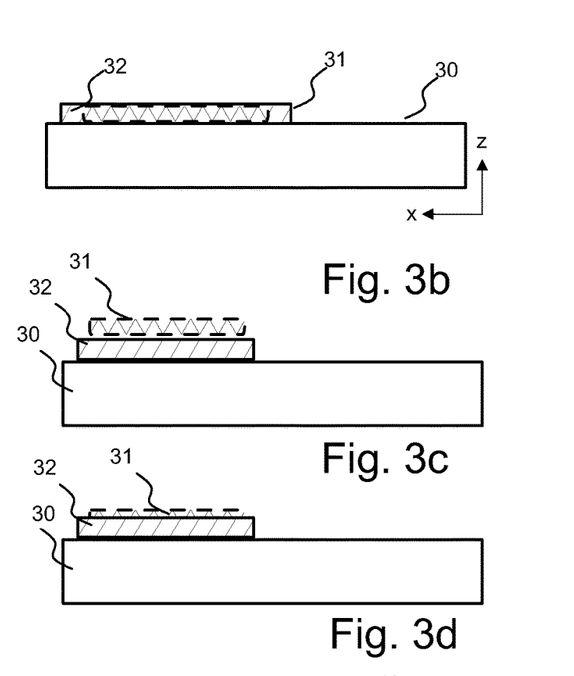
FIGS. 3b-3d show a side-view of the mobile device of FIG. 3a according to an example embodiment.

FIG. 3b shows a side-view of the mobile device 30 of FIG. 3a according to an example embodiment. In this embodiment, both coils 31, 32 are on the same plane and the coil 32 surrounds the coil 31.

FIG. 3c shows a side-view of the mobile device 30 of FIG. 3a according to an example embodiment. In this embodiment, coils 31, 32 are partly on the same plane and the coil 32 surrounds the coil 31 partly.

FIG. 3d shows a side-view of the mobile device 30 of FIG. 3a according to an example embodiment. In this embodiment, coils 31, 32 are partly on the different plane.

Figure 4A:
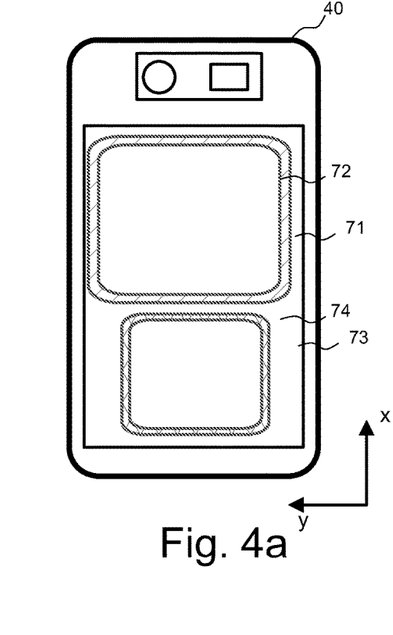
FIG. 4a shows a back-side view of a mobile device with resonant coils of resonant tanks according to an example embodiment.
Figure 4B:
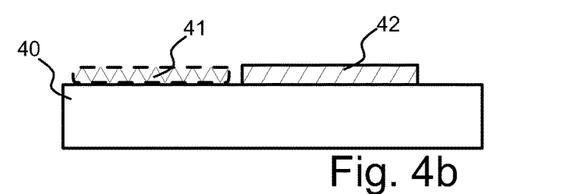
FIGS. 4b-4d show a side-view of the mobile device of FIG. 4a according to an example embodiment.
Figure 4C:
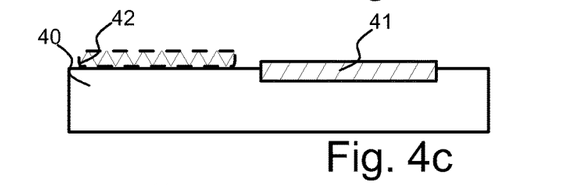
Figure 4D:
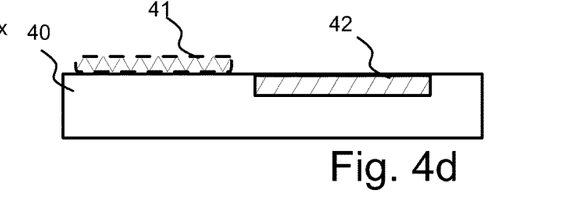

FIG. 4a shows a back-side view of a mobile device 40 with inductive energy receiver coils of resonant tanks according to an example embodiment. In this embodiment coils 41, 42 form planes and the normal of the planes are parallel i.e. normal of the coil 41 parallels normal of the coil 42. In embodiments 4b-4d, when seen from above i.e. in the direction of the normal (z-direction) coils 41, 42 do not overlap i.e. coil 41 is next to the coil 42. However, coils 41, 42 can be arranged to the same plane (see FIG. 4b), partly to the same plane (see FIG. 4c), or to a different plane (see FIG. 4d). All parts of the mobile device 40 are not shown.

Figure 5:
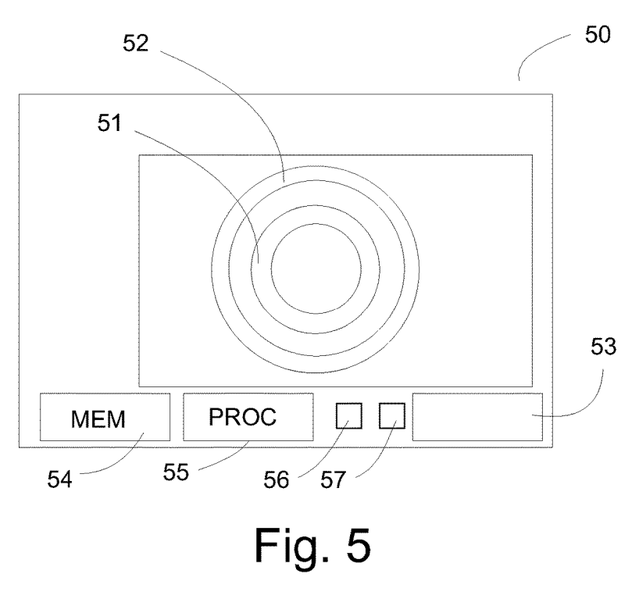
FIG. 5 shows a multi-mode WLC receiver apparatus according to an example embodiment.

FIG. 5 shows an example of an electronic apparatus 50 i.e. a multi-standard WLC receiver, that comprises two resonant tanks i.e. wireless charging receivers, wherein the first resonant tank comprises a first inductive energy coil 51 and the second tank comprises a second inductive energy coil 52. The first tank supports a first charging standard i.e. the coil 51 of the first tank is arranged to receive inductive energy at a first frequency and the second tank supports a second charging standard i.e. the coil 52 of the second tank is arranged to receive inductive energy at the second frequency that is different than the first frequency. In addition tank structures may comprise a frequency tuner and a switch structure (not shown) comprising a resonance mode switch and a power delivery mode switch. These switches may be electrical or mechanical switches. In addition, the apparatus 50 comprises a control logic circuit 53 to determine which coil is active and which should be disabled and used as an additional resonator for the active coil. The coil may be active if the charging signal transmitting by a wireless charger (not shown) according to the particular standard is supported by that tank comprising that active coil. The control logic circuit 53 may be connected to the wireless charging receiver circuits, for example, a WLC RX IC 1 56 and WLC RX IC 2 56. The wireless charging receiver circuits 56 and 57 may be connected to coils 52 and 52. If one of the WLC receiver circuits determines that there's a valid charging signal for it, the control logic circuit 53 (or alternatively the active WLC receiver circuit) may enable the resonant mode in the resonant tank circuit of the non-active WLC receiver. Enabling the resonant mode may comprise disconnecting the non-active coil from the WLC circuit and/or connecting an additional capacitor to the resonant tank of the non-active coil. The apparatus 50 further comprises a memory 54 configured to store computer program code used for operating switch structures and a processor 55 that executes the program code to perform the apparatus' functionality. In addition, the apparatus comprises a power delivery circuitry arranged to supply power to the coils.

However, it is also possible that there are more WLC secondary coils in addition to the coils 51 and 52. The apparatus 50 may further have one or more LEDs (not shown) for indicating the user about the charging process. The apparatus 50 may further have one or more physical buttons or one or more touch-screen buttons. The apparatus 50 may comprise a keypad being provided either on the display as a touch-screen keypad or on the housing of the apparatus as a physical keypad (not shown). The apparatus 50 may further comprise a microphone and a loudspeaker (not shown) to receive and to transmit audio. The apparatus 50 may also comprise a communication interface (not shown) configured to connect the apparatus 50 to another device, via wireless and/or wired network, and to receive and/or transmit data by said wireless/wired network. The apparatus 50 may further comprise a display and an input/output element to provide e.g. user interface views to the display. Further the apparatus 50 may comprise a loudspeaker to provide audio messages for the user about charging, such as charging is ready.

Figure 6:
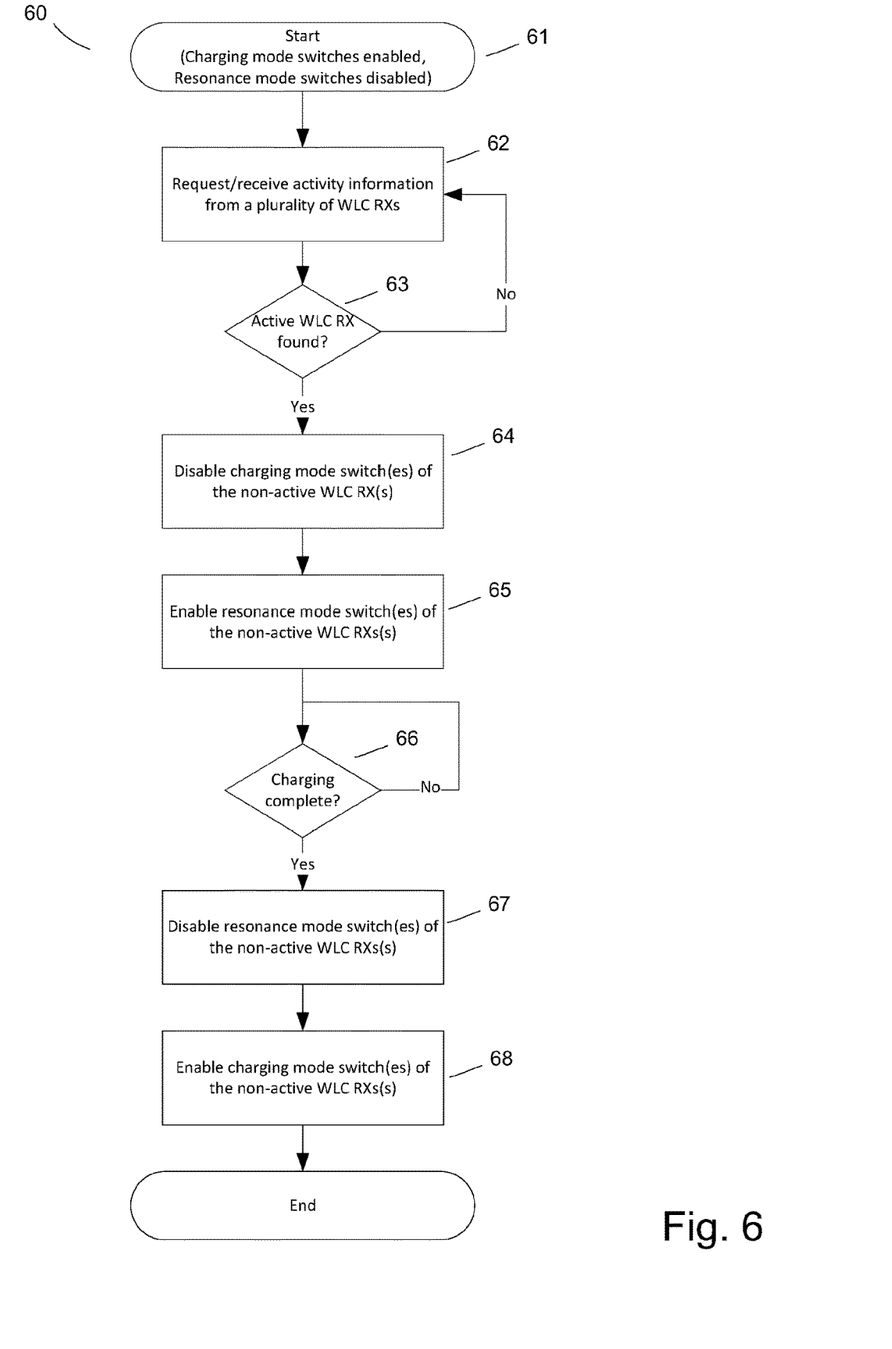
FIG. 6 shows a flow chart of a charging method of a multi-receiver WLC apparatus according to an example embodiment.

FIG. 6 shows a flow chart of a charging method 60 of a multi-standard WLC receiver apparatus according to an example embodiment. The functionality described in FIG. 6 may be implemented, e.g., in the control logic circuit of a multi-standard WLC power apparatus. The multi-standard WLC receiver apparatus of this example comprises a plurality wireless charging receiver circuits (WLC RXs), each WLC RX is specific to a particular standard and WLC RXs are able to determine whether suitable charging signal exists. In start step 61 power delivery mode switches of the multi-standard WLC receiver apparatus are enabled and resonance mode switches of the multi-standard WLC receiver apparatus are disabled. In step 62 a control logic circuit requests i.e. sends a request for activity indication to a plurality of WLC RXs or automatically receives activity indication from a plurality of WLC RXs. The WLC RXs may transmit the activity information to the control logic that operates the switches accordingly. If there is an active WLC RX (in step 63), wireless power delivery mode switches of a plurality of non-active WLC RXs are disabled in step 64. If there is not an active WLC RX (in step 63), the method returns back to step 62. In step 65 wireless resonance mode switches of a plurality of non-active WLC RXs are enabled. During steps 64 and 65 the multi-standard WLC receiver apparatus is receiving energy. In step 66 it is checked if charging is complete. If no, the multi-standard WLC receiver apparatus continues receiving WLC energy. If yes, in step 67 resonance mode switches of a plurality of non-active WLC RXs are disabled and in step 68 power delivery mode switches of a plurality of non-active WLC RXs are enabled. Although the operations of FIG. 6 have been described in context of a wireless charging apparatus, it should be understood that these operations may be used to deliver the received energy directly to a load.

Coils used in resonant tanks may differ. For example, it is possible to use a litz coil wire and/or a wire with different diameter in coils, for example, a coil wire of a first coil can be thinner than a coil wire of a second coil i.e. coils of different resonant tanks of one device to be charged can have different thickness. Or coils can comprise different number of coil turns. Moreover, shape and diameters of coils of different resonant tanks of one device to be charged can vary, but they may also be the same among coils, for example, if different coil wire diameters are used. It should also be noted that when seen from above i.e. in the direction of the normal coils may partly overlap i.e. the first coil may be partly on the second coil. Thus, the shape and size of the coils are not restricted to shown embodiments. Although the example embodiments of invention are herein described in context of a multi-mode wireless charging receiver, the invention is equally applicable in multi-mode wireless charging transmitters i.e. the multi-mode WLC structure may be used to transfer i.e. receive or transmit energy wirelessly.

It is obvious that the present invention is not limited solely to the above-presented embodiments, but it can be modified within the scope of the appended claims.

The invention claimed is:

1. An apparatus, comprising:
a first wireless power circuit connectable to a first resonant tank comprising a first inductive energy coil, a frequency tuner, a resonance mode switch and a power delivery mode switch, wherein the first resonant tank is configured to transfer inductive energy at a first frequency according to a first standard,
a second wireless power circuit connectable to a second resonant tank comprising a second inductive energy coil, wherein the second resonant tank is configured to transfer inductive energy at a second frequency according to a second standard, wherein the first frequency is different than the second frequency, and
a control logic circuit configured to determine which coil is active based on reception of an activity indication from one or more of the first wireless power circuit or the second wireless power circuit,
wherein when the second inductive energy coil is determined by the control logic circuit to be active:
the resonance mode switch is configured to enable tuning of the first resonant tank to the second frequency,
the power delivery mode switch is configured to disconnect the first inductive energy coil from the first wireless power circuit, and
the frequency tuner is configured to tune the first resonant tank to the second frequency.

2. The apparatus according to claim 1, wherein when the control logic circuit has determined that the first inductive energy coil is active:
the resonance mode switch is configured to disable tuning of the first resonant tank to the second frequency, and
the power delivery mode switch is configured to enable an electrical connection between the first inductive energy coil and the first wireless power circuit for transferring inductive energy.

3. The apparatus according to claim 1, wherein the second resonant tank further comprises a second resonance mode switch and a second power delivery mode switch.

4. The apparatus according to claim 3, wherein when the control logic circuit has determined that the first inductive energy coil is active:
the second resonance mode switch is configured to enable tuning of the second resonant tank to the first frequency, and
the second power delivery mode switch is configured to disconnect the second inductive energy coil from the second wireless power circuit.

5. The apparatus according to claim 3, wherein when the control logic circuit has determined that the second inductive energy coil is active:
the second resonance mode switch is configured to disable tuning of the second resonant tank to the first frequency, and
the second power delivery mode switch is configured to enable electrical connection between the second inductive energy coil and the second wireless power circuit for transferring inductive energy.

6. The apparatus according to claim 1, wherein at least one of the first and second wireless power circuits is a wireless power receiver circuit, and wherein the control logic circuit is configured to determine which coil is active based on receiving an activity indication from the wireless power receiver circuit.

7. The apparatus according to claim 6, wherein the control logic circuit is further configured to send a request for activity indication to the wireless power receiver circuit.

8. The apparatus of claim 1, wherein the frequency tuner comprises a capacitor.

9. The apparatus according to claim 1, wherein the apparatus is a mobile phone.

10. A method comprising:
determining an active inductive energy coil of a multi-mode wireless charging apparatus comprising a first resonant tank, a first wireless power circuit connectable to the first resonant tank, and a second resonant tank, wherein the first resonant tank comprises a first inductive energy coil, a frequency tuner, a resonance mode switch and a power delivery mode switch, wherein the first inductive energy coil is configured to transfer inductive energy at a first frequency according to a first standard, and the second resonant tank comprises a second inductive energy coil, wherein the second inductive energy coil is configured to transfer inductive energy at a second frequency according to a second standard, wherein the first frequency is different than the second frequency, and wherein determining the active inductive energy coil is based on reception of an activity indication from the first wireless power circuit, and when the second inductive energy coil is determined to be active, enabling tuning of the first resonant tank to the second frequency by the resonance mode switch, disconnecting the first inductive energy coil from the first wireless power circuit by the power delivery mode switch, and tuning the first resonant tank to the second frequency by the frequency tuner.

11. The method according to claim 10, wherein the method further comprises:

disabling tuning of the first resonant tank to the second frequency by the resonance mode switch and enabling an electrical connection between the first inductive energy coil and the first wireless power circuit for transferring inductive energy by the power delivery mode switch when the first inductive energy coil is determined to be active.

12. The method according to claim 10, wherein the second resonant tank further comprises a second wireless power circuit connectable to the second resonant tank, a second resonance mode switch and a second power delivery mode switch, the method further comprises:

enabling tuning of the second resonant tank to the first frequency by the second resonance mode switch and disconnecting the second inductive energy coil from the second wireless power circuit by the second power delivery mode switch when the first inductive energy coil is determined to be active.

13. The method according to claim 12, wherein the method further comprises:

disabling tuning of the second resonant tank to the first frequency by the second resonance mode switch and enabling an electrical connection between the second inductive energy coil for receiving inductive energy by the second power delivery mode switch when the second inductive energy coil is determined to be active.

14. The method according to claim 10, wherein the first wireless power circuit is a wireless power receiver circuit, and wherein determining the active inductive energy coil is based on receiving an activity indication from the wireless power receiver circuit.

15. The method according to claim 14, further comprising:

sending a request for activity indication to the wireless power receiver circuit.

16. The method of claim 10, wherein the frequency tuner comprises a capacitor.

17. A computer program product embodied on a non-transitory computer readable medium, comprising computer program code configured to, when executed on at least one processor, cause an apparatus to:

determine an active inductive energy coil of the apparatus comprising a first resonant tank, a first wireless power circuit connectable to the first resonant tank, and a second resonant tank, wherein the first resonant tank comprises a first inductive energy coil, a frequency tuner, a resonance mode switch and a power delivery mode switch, wherein the first inductive energy coil is configured to transfer energy at a first frequency according to a first standard, and the second resonant tank comprises a second inductive energy coil, wherein the second inductive energy coil is configured to transfer inductive energy at a second frequency according to a second standard, wherein the first frequency is different than the second frequency, and wherein determination of the active inductive energy coil is based on reception of an activity indication from the first wireless power circuit, and when the second inductive energy coil is determined to be active:

enable tuning of the first resonant tank to the second frequency by the resonance mode switch, disconnect the first inductive energy coil from the first wireless power circuit by the power delivery mode switch, and tune the first resonant tank to the second frequency by the frequency tuner.

18. The computer program product of claim 17, wherein the computer program code is further configured to cause the apparatus to:

disable tuning of the first resonant tank to the second frequency by the resonance mode switch and enable an electrical connection between the first inductive energy coil and the first wireless power circuit for transferring inductive energy by the power delivery mode switch when the first inductive energy coil is determined to be active.

19. The computer program product of claim 17, wherein the second resonant tank further comprises a second wireless power circuit connectable to the second resonant tank, a second resonance mode switch and a second power delivery mode switch, and wherein the computer program code is further configured to cause the apparatus to:

enable tuning of the second resonant tank to the first frequency by the second resonance mode switch and disconnect the second inductive energy coil from the second wireless power circuit by the second power delivery mode switch when the first inductive energy coil is determined to be active.

20. The computer program product to claim 19, wherein the computer program code is further configured to cause the apparatus to:

disable tuning of the second resonant tank to the first frequency by the second resonance mode switch and enable an electrical connection between the second inductive energy coil for receiving inductive energy by the second power delivery mode switch when the second inductive energy coil is determined to be active.

* * * * *

UNITED STATES PATENT AND TRADEMARK OFFICE
CERTIFICATE OF CORRECTION

PATENT NO. : 10,044,234 B2
APPLICATION NO. : 14/892541
DATED : August 7, 2018
INVENTOR(S) : Jari Muurinen et al.

It is certified that error appears in the above-identified patent and that said Letters Patent is hereby corrected as shown below:

In the Claims

On Column 12, Claim 20, Line 49:
Please delete "product to claim 19" and insert --product of claim 19--

Signed and Sealed this
Eighteenth Day of December, 2018

Andrei Iancu
*Director of the United States Patent and Trademark Office*